United States Patent [19]

Melugin et al.

[11] 3,819,440

[45] June 25, 1974

[54] TECHNIQUE FOR RECOVERY OF VOICE DATA FROM HEAT DAMAGED MAGNETIC TAPE

[75] Inventors: Joe F. Melugin, La Porte; David E. O'Brien, III, Houston, both of Tex.

[73] Assignee: The United States of America as represented by the Administrator of the National Aeronautics of Space Administration, Washington, D.C.

[22] Filed: Jan. 16, 1973

[21] Appl. No.: 324,029

[52] U.S. Cl. ............ 156/94, 117/2 R, 179/100.2 A, 179/100.2 B, 264/36

[51] Int. Cl. ............ B32b 35/00

[58] Field of Search ............ 179/100.2 A, 100.2 B; 340/146.3 C; 156/94; 117/2 R; 264/36

[56] References Cited

UNITED STATES PATENTS 3,466,156 9/1969 Peters et al. ................ 179/100.2 A 3,551,202 12/1970 Wright et al. ................ 179/100.2 A

*Primary Examiner*—Edward G. Whitby

*Attorney, Agent, or Firm*—Marvin J. Marnock; Marvin F. Matthews; Carl O. McClenny

[57] ABSTRACT

A method for conditioning, and thus enabling retrieval of intelligence from, magnetic tapes after damage from heat has caused the tape to wrinkle and curl severely thereby reducing tape width to less than one-half its original size. The damaged tape is superposed on a first piece of splicing tape with the oxide side of the magnetic tape in contact with the adhesive side of the splicing tape and then carefully smoothed by a special tool. A second piece of splicing tape is placed on the backing side of the magnetic tape then the resulting tape stack is trimmed to the original width of the magnetic tape. After the first piece of splicing tape is carefully removed from the oxide side of the damaged magnetic tape, the resulting magnetic tape is then ready to be placed into a recorder for playback.

2 Claims, 8 Drawing Figures

TECHNIQUE FOR RECOVERY OF VOICE DATA FROM HEAT DAMAGED MAGNETIC TAPE

ORIGIN OF THE INVENTION

The invention described herein was made by employees of the U.S. Government and may be manufactured and used by or for the Government of the United States of America for governmental purposes without the payment of any royalties thereon or therefor.

BACKGROUND OF THE INVENTION

1. Field of Invention

Methods relating to the repair of damaged magnetic tapes and recovery of data therefrom.

2. Description of the Prior Art

The previous method of flattening damaged magnetic tapes and recovering data therefrom has been to carefully roll the distorted tape into a tape stack and heat-soak the stack in a temperature of from 150° to 170°F for a period of approximately 24 hours. Such a method is practical only where the resulting tape width in its damaged condition is at least one-half its original width. The instant invention overcomes the limitations of the previous methods.

OBJECTS AND SUMMARY OF THE INVENTION

The specification teaches a method of recovering data from magnetic tape which has been so badly damaged that previous methods of recovery cannot be used. The process of this invention has particular utility in instances where the tape is badly wrinkled and tightly curled in toward the polyester backing. In one instance where this process was used, the original tape width of 0.150 inch was reduced to approximately 0.03 to 0.05 inch. This extreme curling made it impossible to roll the tape into a tape stack as the previous method required. Thus, it is an object of the invention to provide a new process for conditioning badly damaged magnetic tape such that recovery of data therefrom is possible.

DESCRIPTION OF THE PREFERRED EMBODIMENTS

Figure 1:
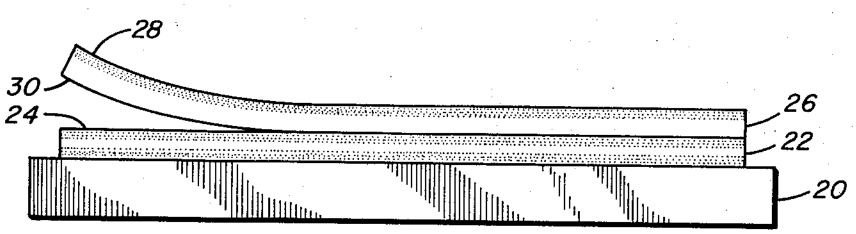
FIGS. 1, 2, 3, 4, 5, 7, and 8 are front elevation views depicting various steps in the method described in the specification.

With reference now to the drawings, the process is performed in the following manner and sequence: In FIG. 1, a suitable work surface 20 is prepared on which a length of double adhesive tape 22 (adhesive on both sides) is placed, leaving one adhesive side 24 exposed. An adequate length of a first splicing tape 26 having an adhesive side 28 and a polyester backing side 30, such as Scotch No. 620, is then superposed onto the exposed surface 24 of the double adhesive tape 22 with the adhesive side 28 of the splicing tape 26 up or exposed.

Figure 2:
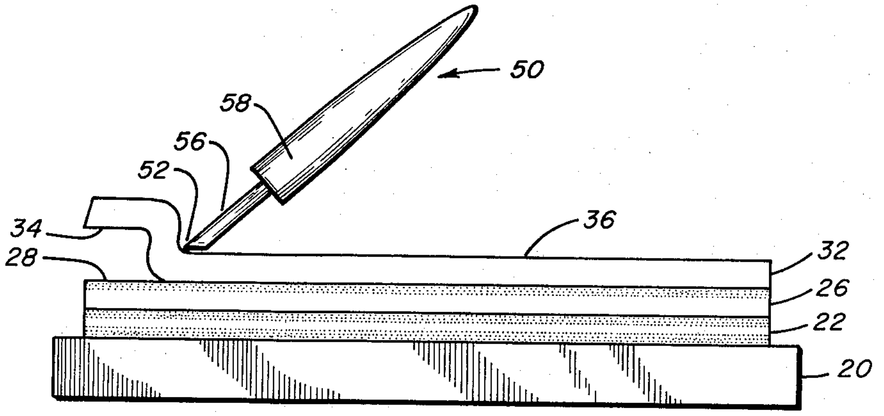
Figure 3:
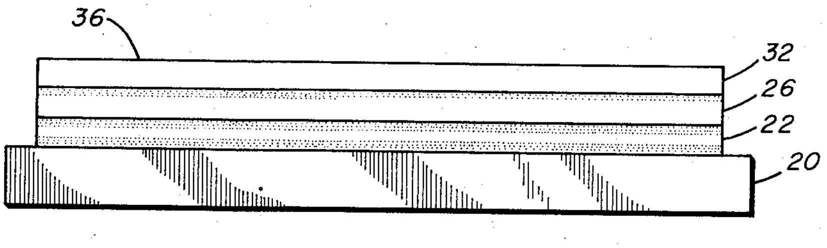

Referring now to FIG. 2, the damaged magnetic tape 32, having an oxide side 34 and a polyester backing side 36, is then superposed onto the splicing tape 26 with the oxide surface 34 of the damaged magnetic tape 32 down and in intimate contact with the adhesive side 28 of the first length of splicing tape 26. This step is accomplished with the air of a carefully prepared non-magnetic tool 50, preferably wooden, having a handle or holder 58, and a shank portion 56 having a tapered end or point 52. The point 52 of the tool 50 is used to carefully work out all wrinkles, curls, and crevices in the damaged magnetic tape 32 such that the damaged magnetic tape 32 will lie superposed on the first length of splicing tape 26, as flat and smooth as possible with its oxide side 34 down and adhering to the adhesive side 28 of the first length of splicing tape 26. The result of the process to this point is shown in FIG. 3.

Figure 4:
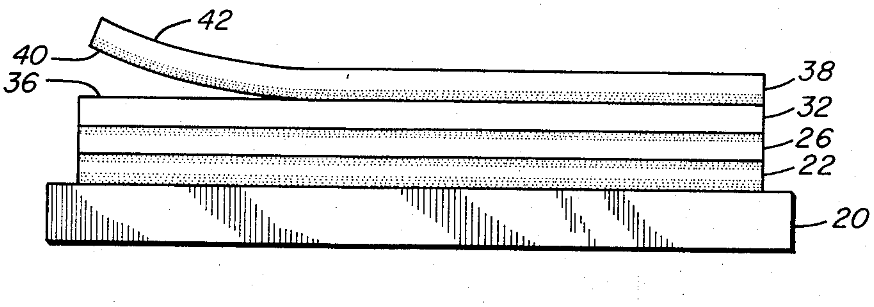
Figure 5:
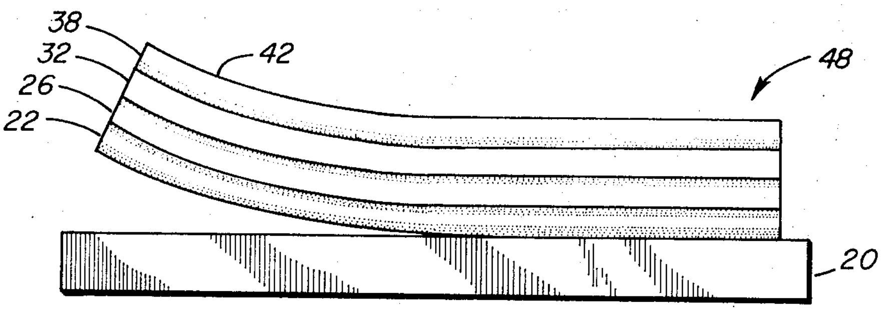

Referring now to FIG. 4, when all of the damaged magnetic tape 32 has been worked smoothly onto and is adhered to the adhesive side 28 of the splicing tape 26, a second piece of splicing tape 38, also having an adhesive side 40 and a polyester backing side 42 is then caused to adhere smoothly to the polyester backing side 36 of the damaged magnetic tape 32. The resulting four-layer tape stack 48 (FIG. 5) is then carefully peeled from the work surface 20. If desired, only the top two layers 32 and 38 may be peeled free, forming the tape stack 54.

Figure 6:
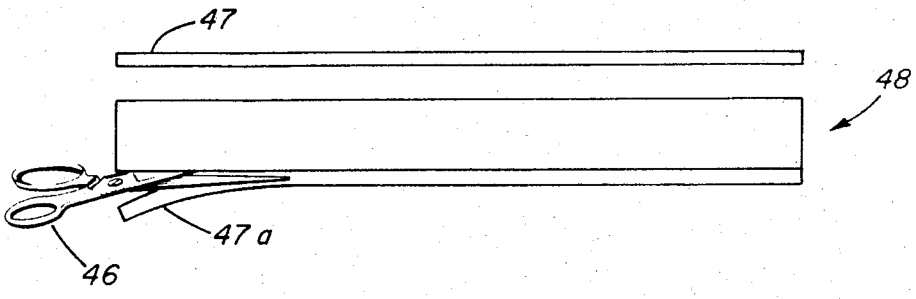
FIG. 6 is a plan view of still another step in the process.

Referring now to FIG. 6, the tape stack 48 (or 54, if desired) is carefully trimmed by scissors 46 or other means such as a paper cutter (not shown). The trimmed edges 47 and 47*a* reduce the width of the tape stack 48 (or 54) to the original width of the damaged magnetic tape 32. It will likewise be appreciated that trimming of the edges 47 and 47a may be done prior to removing the tape stack 48 from the work surface 20. The trimmed edges 47 and 47*a* are discarded.

Figure 7:
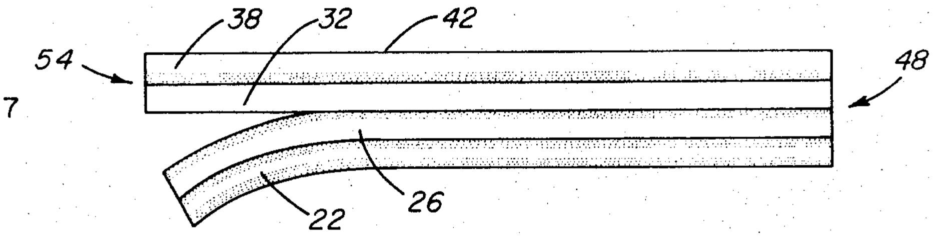
Figure 8:
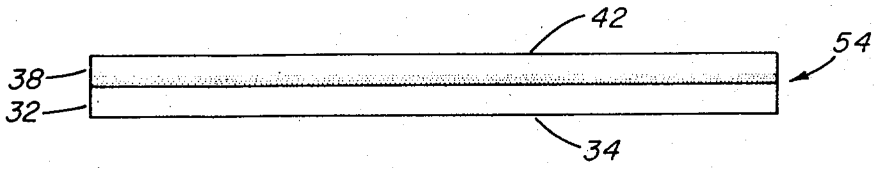

Referring now to FIG. 7, the first splicing tape 26 adhering to the oxide side 34 of the damaged magnetic tape 32 is then carefully removed along with the double adhesive tape 22. The two-layer tape stack 54 (FIG. 8), consisting of the damaged magnetic tape 32, with its oxide side 34 exposed and with the second piece of splicing tape 38 adhered to the polyester backing side 36 of the damaged magnetic tape 32 is thus formed. The resulting two-layer tape stack 54 comprising the damaged magnetic tape 32 with the second piece of splicing tape 38 now forming its backing side, may then be spliced into a clean magnetic tape cassette or reel and rewound by hand such that the repaired magnetic tape 54 is on the supply reel or on the supply side of the cassette, whichever the case may be. The cassette or reel may then be loaded into a suitable magnetic tape recorder/reproducer for playback. It is advisable to make a copy of the repaired tape 54 on the first run through the reproduce mechanism of the recorder since further deterioration of the oxide side 34 is to be expected on each pass. It will also be appreciated that the two-layer tape stack 54 may be separated from the four-layer tape stack 48 prior to trimming the edges 47 and 47*a*.

The point 52 of the tool 50 used to smooth the wrinkles out of the damaged magnetic tape 32 may be fabricated from a wooden cotton-swab 56 or rod approximately one-sixteenth inch in diameter. A rod approximately 1 and ½ inches in length may be used and fitted into a draftsman's lead holder 58 for easy handling. The rod 56 is then cut at an angle of approximately 30° to form a sharp point 52. The flat cut surface and edges are then smoothed with fine sandpaper to prevent any cutting or scratching of the tape 32. The point 52 should not be rounded too much because a small point is needed to work into the very tight wrinkles and curls in the damaged magnetic tape 32.

It will be appreciated that the work surface 20 should be one which is very smooth and hard, such as glass, and that the work surface 20 should likewise be free of contaminants or solvents which would damage or contaminate any of the tapes used in this process.

In practicing this technique, it is suggested that certain preliminary precautions be exercised. These precautions include taking photographs of the damaged tape in position in the recorder, cassette, or reel, and ensuring that the tape can later be reoriented in its correct position. It may also be advantageous to perform an operation on a practice tape to gain familiarity with the technique and thereby minimize the danger of completely ruining the damaged tape from which data recovery is sought.

This procedure for recovery of data from heat damaged tape obviously will not result in high fidelity reproduction and is subject to time base distortion as well as partial to complete dropout. The extent of degradation is dependent on the severity of damage and the care with which the tape is prepared. Some improvement in the technique may be feasible by masking the center portion of the first length of splicing tape which is used on the oxide side of the magnetic tape.

The technique described herein provides a means to recover data from magnetic tape which has been too heavily damaged to be handled by conventional means. This procedure has the disadvantage of being very time consuming and may not be applicable to long lengths of tape that have been heated to the point that the binders cause layer-to-layer adhesion within the roll.

When using the technique described herein, the exact tape type should be identified and test samples of the same tape should be subjected to similar damage and recovery procedures to determine the extent of oxide shedding when the splicing tape is removed from the oxide side of the tape. The test samples should be processed by the same operator that will prepare the actual data tape. This will provide operator training prior to preparation of the damaged data tape.

It will be appreciated that the method of the present invention is capable of various modifications. By way of example, rather than limitation, the process may be applicable to tapes other than conventional magnetic tapes as described.

What is claimed is:

1. A method for reconditioning damaged magnetic recording tape such that data recorded thereon may be recovered, comprising the steps of:

a. securing a length of double adhesive tape throughout its entire length such that one surface of said double adhesive tape is affixed to a work-surface thereby leaving the outer surface of said double adhesive tape exposed;

b. securing a first length of splicing tape having a smooth side and an adhesive side to the exposed adhesive surface of said double adhesive tape, such that the smooth side of said first length of splicing tape is adhered to the exposed adhesive side of said double adhesive tape;

c. securing one end of said damaged magnetic recording tape to the adhesive side of said first length of splicing tape such that the magnetizable surface of said damaged magnetic recording tape is in contact with the adhesive side of said first length of splicing tape;

d. working the full length of said damaged magnetic recording tape onto the adhesive side of said first length of splicing tape such that said damaged magnetic recording tape lies flatly and smoothly upon the surface of said first length of splicing tape and is coincident therewith;

e. superposing a second length of splicing tape having a smooth side and an adhesive side to the non-magnetizable side of said damaged magnetic recording tape such that the adhesive side of said second length of splicing tape lies smoothly in contact with the non-magnetizable side of said damaged magnetic recording tape;

f. trimming excess tape from each edge of said second length of splicing tape such that its width is the same as was the damaged magnetic recording tape prior to the time it became damaged; and g. separating said first length of splicing tape from the magnetizable side of said damaged magnetic recording tape thereby forming a two-layer tape consisting of said damaged magnetic recording tape with said second length of splicing tape superposed thereon.

2. A method for reconditioning damaged magnetic recording tape such that data recorded thereon may be recovered, comprising the steps of:

a. preparing a smooth, clean, work-surface;

b. securing a length of double adhesive tape to said work-surface thereby leaving one surface of said double adhesive tape exposed;

c. securing a first length of splicing tape having a smooth side and an adhesive side to the exposed surface of said double adhesive tape, such that the smooth side of said first length of splicing tape is adhered to the exposed adhesive side of said double adhesive tape;

d. securing one end of said damaged magnetic recording tape to the adhesive side of said first length of splicing tape such that the magnetizable surface of said damaged magnetic recording tape is in contact with the adhesive side of said first length of splicing tape;

e. working the full length of said damaged magnetic recording tape onto the adhesive side of said first length of splicing tape such that said damaged magnetic recording tape lies flatly and smoothly upon the surface of said first length of splicing tape and is coincident therewith;

f. securing a second length of splicing tape having a smooth side and an adhesive side to the non-magnetizable side of said damaged magnetic recording tape such that the adhesive side of said second length of splicing tape lies smoothly in contact with the non-magnetizable side of said damaged magnetic recording tape, thereby forming a four-layer tape pile;

g. removing said four-layer tape pile from said work surface;

h. trimming excess tape from each edge of said four-layer tape pile such that the width of the tape pile is the same width as was the damaged magnetic recording tape prior to the time it became damaged; and i. peeling said first length of splicing tape from the magnetizable side of said damaged magnetic recording tape.

* * * * *